Patented Jan. 7, 1930

1,742,757

UNITED STATES PATENT OFFICE

ELMER G. CROAKMAN, OF AKRON, OHIO, ASSIGNOR TO NATIONAL ANILINE & CHEMICAL COMPANY, INC., OF NEW YORK, N. Y., A CORPORATION OF NEW YORK

DYEING OF RUBBER

No Drawing.   Application filed November 8, 1927.   Serial No. 232,000.

This invention relates to an improved process of coloring rubber and to the products resulting therefrom.

It is well known that certain basic dyes of the triarylmethane series are suitable for use in coloring rubber, or for dyeing rubber products which are vulcanized by the cold cure, but that said dyes are unsuitable for dyeing rubber products which are to be vulcanized under the action of heat. For example, Victoria blue B base (Schultz No. 559) can be used in the coloring of dipped rubber goods, or in cold vulcanization processes, but when compounded with rubber and subjected to vulcanization under the action of heat, e. g., at a temperature of about 140°–141° C., the color is fugitive and changes from a bright blue in the unvulcanized product to a weak, light brown in the finished product.

According to the present invention, improved results can be obtained in the dyeing of rubber and rubber-like substances, or of rubberized or rubber coated goods, when such materials are vulcanized under the action of heat by incorporating the rubber mix containing sulfur or other vulcanizing agent before the vulcanization with a color base of the triarylmethane series, more particularly of the diphenylnaphthylmethane series such as Victoria blue B base, and especially one which is soluble in oil or in other organic solvents, and with or without the addition of stearic or oleic acid, or the like, and an aromatic nitro body, particularly a nitrophenol such as, for example, dinitrophenol. The presence of the nitro body in conjunction with the color base permits the rubber compound to be vulcanized under the action of heat with the production of a colored finished product having shades which are more or less of the same general order as the dyestuff, or mixture of dyestuffs, before vulcanization.

In carrying out the invention, the color base and the nitro body may be incorporated into the rubber mix either separately or together, and simultaneously with or after the addition of the other compounding ingredients, and the compounded mixture then vulcanized under the action of heat, preferably at a temperature of about 140°–141° C. Any suitable organic vulcanization accelerator may be employed as an adjuvant in the vulcanization process.

The invention will be further illustrated by the following specific examples, but it will be understood that the invention is not limited thereto. The parts are by weight.

Example: To a rubber mix consisting of

|   | Parts |
|---|---|
| Pale crepe | 100 |
| Zinc oxide | 10 |
| Sulfur | 4 |
| Diphenylguanidine | 3/4 | there is incorporated on the mixing mill one-half part of Victoria blue B base (i. e. tetramethylphenyl - triamino - diphenyl - alpha-naphthyl-carbinol) and one-half part of 2,4-dinitrophenol. The mixture is vulcanized either in open steam or in a mold for sixty minutes at 40 lbs. steam pressure (about 141° C.). The vulcanized product is of a bright green-blue shade fast to light. It differs only slightly in shade and strength of color from the uncured material.

The vulcanization of a rubber mix of the same composition with the addition of one-half part of Victoria blue B base but with no dinitrophenol present gives a vulcanized product having a light brown color.

In the above example, if trinitrophenol is used in place of the dinitrophenol, the final vulcanized product also possesses a greenish-blue color. It may be further pointed out that light to dark greenish-blue shades can be produced by decreasing or increasing the amount of dinitrophenol compared to the amount of Victoria blue B base used. Other organic vulcanization accelerators may be used in place of diphenylguanidine; and other suitable fillers and compounding ingredients may also be used together with or instead of the zinc oxide without departing from the scope of this invention.

I claim:

1. Process of coloring rubber which comprises incorporating a triarylmethane dye base and an aromatic nitro body with a rubber mix and vulcanizing the mixture under the action of heat.

2. Process of coloring rubber and the like which comprises incorporating a diphenylnaphthylmethane dye base and a nitrophenol with a rubber mix, and vulcanizing the mixture under the action of heat.

3. Process of coloring rubber and the like which comprises incorporating Victoria blue B base and 2.4-dinitrophenol with a rubber compound, and vulcanizing the mixture under the action of heat.

4. A colored rubber product resulting from curing, under the action of heat, a mixture comprising rubber, a curing agent, zinc oxide, a vulcanizing adjuvant, a triarylmethane dye base, and an aromatic nitro body.

5. A colored rubber composition comprising cured rubber, a diphenylnaphthylmethane dye base, and a nitrophenol.

6. A composition containing rubber, Victoria blue B base, and a dinitrophenol.

7. A colored rubber product resulting from curing rubber in the presence of Victoria blue B base and of 2.4-dinitrophenol.

8. A vulcanized rubber product comprising rubber vulcanized with sulfur and colored with a diphenylnaphthylmethane dye base and a nitrophenol, said dye base and nitrophenol being incorporated therewith before the vulcanization.

9. Process of coloring rubber and the like which comprises incorporating a triarylmethane dye base and a nitrophenol with a rubber mix and vulcanizing the mixture under the action of heat.

10. Process of coloring rubber and the like which comprises incorporating a diphenylnaphthylmethane dye base and an aromatic nitro body with a rubber mix and vulcanizing the mixture under the action of heat.

11. A hot-vulcanized colored rubber product having incorporated therewith before vulcanization a triarylmethane dye base and an aromatic nitro compound, and being of substantially the same shade of color as is the mixture of ingredients before vulcanization.

12. A hot-vulcanized colored rubber product having incorporated therewith before vulcanization a diphenylnaphthylmethane dye base and an aromatic nitro compound, and being of substantially the same shade of color as is the mixture of ingredients before vulcanization.

13. A hot-vulcanized colored rubber product having incorporated therewith before vulcanization a triarylmethane dye base and a nitrophenol, and being of substantially the same shade of color as is the mixture of ingredients before vulcanization.

14. A hot-vulcanized colored rubber product having incorporated therewith before vulcanization a diphenylnaphthylmethane dye base and a nitrophenol, and being of substantially the same shade of color as is the mixture of ingredients before vulcanization.

15. A hot-vulcanized colored rubber product having incorporated therewith before vulcanization Victoria blue base and 2.4-dinitrophenol, and being of substantially the same shade of color as is the mixture of ingredients before vulcanization.

In testimony whereof I affix my signature.

ELMER G. CROAKMAN.